United States Patent [19]

Budinski

[11] Patent Number: 4,991,252
[45] Date of Patent: Feb. 12, 1991

[54] VARIABLE LENGTH WINDSHIELD WIPER ARM ASSEMBLY

[75] Inventor: John A. Budinski, Jamestown, Ohio

[73] Assignee: General Motors Corporation, Detroit, Mich.

[21] Appl. No.: 774,081

[22] Filed: Sep. 9, 1985

[51] Int. Cl.⁵ .................................................. B60S 1/26
[52] U.S. Cl. ................................. 15/250.21; 15/250.23
[58] Field of Search ........... 15/250.13, 250.21, 250.23, 15/250.30, 250.39

[56] References Cited

U.S. PATENT DOCUMENTS

| | | |
|---|---|---|
| 399,492 | 3/1889 | Burke . |
| 1,660,971 | 2/1928 | Lindner . |
| 2,629,891 | 3/1953 | Greene . |
| 3,831,220 | 8/1974 | Gmeiner et al. . |
| 3,831,221 | 8/1974 | Gmeiner et al. . |
| 4,096,763 | 6/1978 | Kell . |
| 4,447,928 | 5/1984 | Schüch et al. ..................... 15/250.21 |
| 4,625,359 | 12/1986 | Egner-Walter et al. ......... 15/250.21 |
| 4,630,327 | 12/1986 | Schmidt et al. ............... 15/250.23 X |

FOREIGN PATENT DOCUMENTS

| | | |
|---|---|---|
| 1162324 | 9/1958 | France . |
| 1170512 | 1/1959 | France . |

OTHER PUBLICATIONS

*Product Engineering*, Jun. 21, 1965, p. 84.
"Ingenious Mechanisms", Machinery Magazine, p. 120, Jul. 1963.

Primary Examiner—Harvey C. Hornsby
Assistant Examiner—Gary K. Graham
Attorney, Agent, or Firm—Saul Schwartz

[57] ABSTRACT

A variable length windshield wiper arm assembly for disposition below the center of a vehicle windshield includes a base supported on the body for angular oscillation about a pivot axis of the body through a wiping stroke, a blade support arm carrying a wiper blade for wiping the window, an outboard slide bearing between the support arm and the base for partially guiding the arm relative to the base and for reacting blade torque, a hypocycloidal gear system on the base having a rotary input member rotatable about the pivot axis and a linear output member connected to an inboard end of the support arm whereby the support arm is guided and linearly reciprocated relative to the base, and a drive system on the body including a planetary gear set driven by the base and a transmission shaft between the planetary set and the rotary input of the hypocycloidal gear system. The gear ratios of the planetary set are selected to rotate the transmission shaft at a rate of about 720° for each angular stroke of the base through the wiping arc.

7 Claims, 4 Drawing Sheets

VARIABLE LENGTH WINDSHIELD WIPER ARM ASSEMBLY

FIELD OF THE INVENTION

This invention relates generally to vehicle windshield wiper systems and, more particularly, to a variable length wiper arm assembly for a system wherein wiping is achieved by a single, centrally supported wiper arm assembly.

DESCRIPTION OF THE PRIOR ART

Windshield wiper systems employing single wiper arm assemblies have been proposed wherein the location of the wiped area is optimized by varying the length of the assembly during the wipe stroke to project a wiper blade closer to the most distant corners of the windshield. In one proposal, a base of the assembly is disposed centrally above the windshield for angular oscillation about a pivot axis of the vehicle with a blade support arm of the assembly linearly slidable on the base. The support arm is reciprocated relative to the base by a crank drive of the assembly through a stroke defining the difference between a minimum length condition of the assembly and a maximum length condition. Movement of the crank drive is coordinated with movement of the base to effect four linear strokes of the support arm during each angular stroke of the base so that the assembly assumes the minimum length condition at the outer angular limits of the wiping arc and at a mid-arc position thereof and the maximum length condition generally midway between the mid-arc position and each of the outer angular limits of the wiping arc. In a similar, more recent proposal, the same wiping pattern is achieved with a variable length wiper arm assembly disposed centrally below the windshield. In this more recent proposal, a blade support arm of the assembly is disposed on and is linearly reciprocated relative to a base of the assembly by a crank drive enclosed in a housing portion of the base. In both systems, slide bearings between the base and the support arm define the motion path of the latter relative to the former while the crank drives function exclusively to reciprocate the support arms in the paths thus defined. A wiper arm assembly according to this invention represents an improvement over these and other known variable length wiper arm assemblies in that it combines a portion of the blade support arm guide function with the blade support arm linear reciprocation drive function thereby to reduce bearing friction and the size of the wiper arm assembly.

SUMMARY OF THE INVENTION

Accordingly, the primary feature of this invention is that it provides a new and improved variable length windshield wiper arm assembly. Another feature of this invention resides in the provision in the new and improved wiper arm assembly of a base supported on the vehicle body for angular oscillation about a pivot axis of the latter through a wiping arc, a support arm with a wiper blade thereon for wiping engagement on the windshield, an outboard guide on the base slidably engaging the support arm between the distal ends of the latter, and a hypocycloidal gear set on the base with a drive pin engaging the support arm at an inboard end thereof, the drive pin oscillating linearly relative to the base through a stroke defining the maximum and minimum length conditions of the assembly along a line coincident with the longitudinal axis of the support arm so that the pin cooperates with the outboard guide in defining a linear path of motion for reciprocation of the support arm relative to the base while simultaneously providing the motive force for effecting reciprocation. Still another feature of this invention resides in the provision in the new and improved wiper arm assembly of a drive system for the hypocycloidal gear set including a stationary bracket supporting thereon a planetary gear set including an internal ring gear on the bracket concentric with the pivot axis of the blade, a planet gear meshing with the ring gear and rotatably supported on a carrier connected to the base and rotatable therewith about the pivot axis, and a sun gear meshing with the planet gear and attached to one end of a transmission shaft disposed on the pivot axis, the other end of the transmission shaft driving a rotary input member of the hypocycloidal gear system and the transmission shaft being driven by the planetary gear set as the base is angularly oscillated. A further feature of this invention resides in the provision in the new and improved wiper arm assembly of a planetary gear set wherein the gear ratios are selected to effect substantially two revolutions of the sun gear for each angular stroke of the base so that the wiper arm assembly experiences substantially the minimum length condition at the outer limits of the wiping arc and at the mid-point thereof and the maximum length condition about midway between the mid-point and each of the outer limits. These and other features of this invention will be readily apparent from the following specification and from the drawings wherein:

Figure 1:
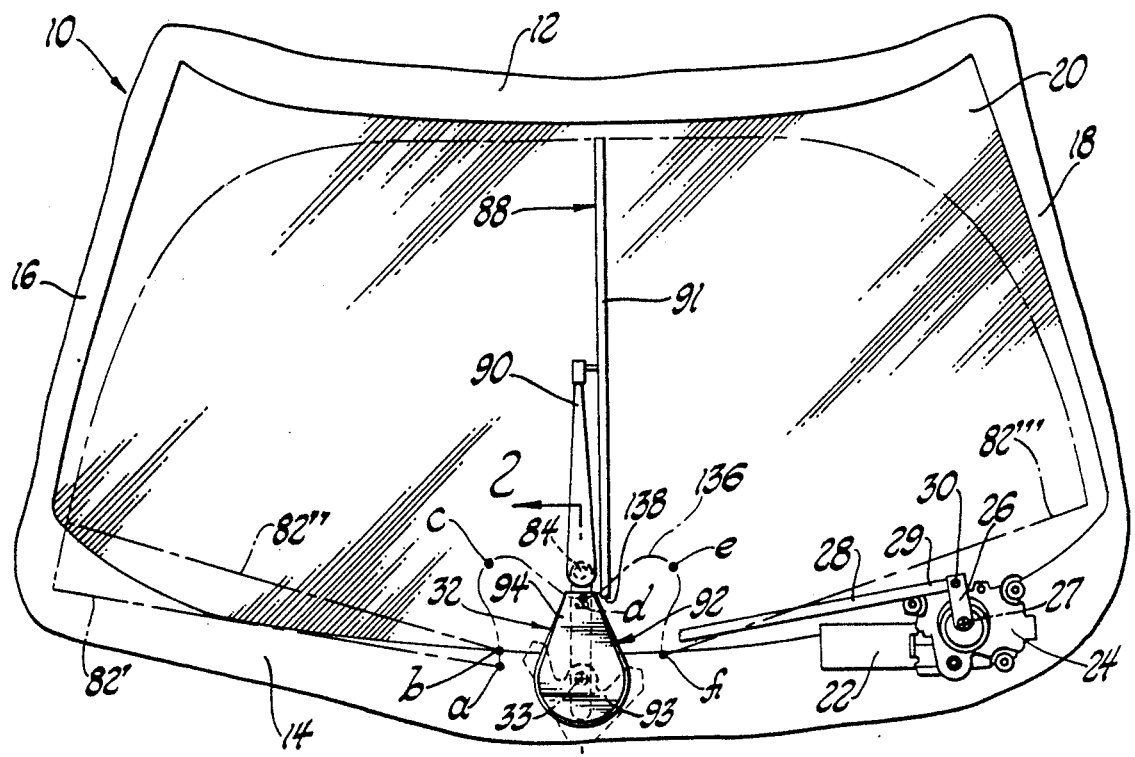
FIG. 1 is a front view of a windshield wiper system having a variable length windshield wiper arm assembly according to this invention and showing the assembly in a mid-arc position.

Referring now to FIG. 1 of the drawings, a vehicle body 10 has a roof 12, a cowl 14 and a pair of pillars 16 and 18 extending between the roof and the cowl. A window opening defined by the roof, cowl and pillars is closed in conventional fashion by a curved windshield 20 which overlaps the lower margin of the opening. An electric motor 22 is mounted on a conventional transmission 24 attached to the cowl 14 and produces continuous rotation of a drive crank 26 of the transmission about an axis 27 in a short throw condition of the drive crank during normal wipe operation and radius extending movement of the drive crank 26 to a long throw condition relative to the axis 27 without rotation about the latter during depressed parking operation. For a full and complete description of such a transmission reference may be made to U.S. Pat. No. 3,691,443, issued Sept. 12, 1972 to Hammer et al and assigned to the assignee of this invention. A partially illustrated transfer link 28 has an outboard end 29 pivotally connected to the drive crank 26 at a pin connection 30 whereby the transfer link 28 reciprocates with simple harmonic motion in generally lateral strokes corresponding to the length of the drive crank 26. The opposite or inboard end of the transfer link, not shown in FIG. 1, is connected to a variable length windshield wiper arm assembly 32 according to this invention whereby the wiper arm assembly is angularly oscillated about a pivot axis 33 of the vehicle body. While the wiper arm assembly 32 according to this invention is shown in a front windshield environment, applications thereof in other environments, such as tailgate rear windows, are contemplated.

Figure 2:
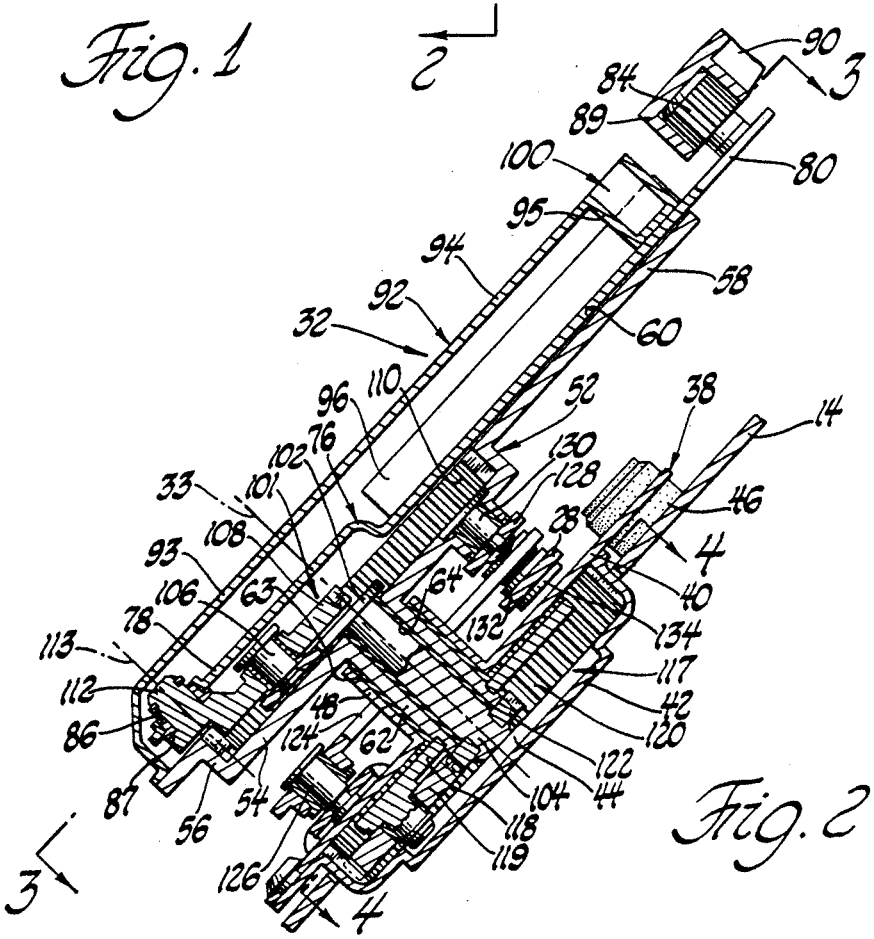
FIG. 2 is an enlarged sectional view taken generally along the plane indicated by lines 2—2 in FIG. 1.

As seen best in FIG. 2, the variable length windshield wiper arm assembly 32 includes a mounting bracket 38 having a support plate 40 and a closure plate 42 which define therebetween a chamber 44. The mounting bracket 38 is attached to the cowl 14 of the vehicle body by conventional fasteners, not shown, which project through vibration isolators carried by the support plate 40, only a single vibration isolator 46 on the support plate being shown in FIG. 2. A right cylindrical flange 48 of the support plate 40 is aligned on the axis 33 of the vehicle body extending generally perpendicular to the cowl 14.

Figure 3:
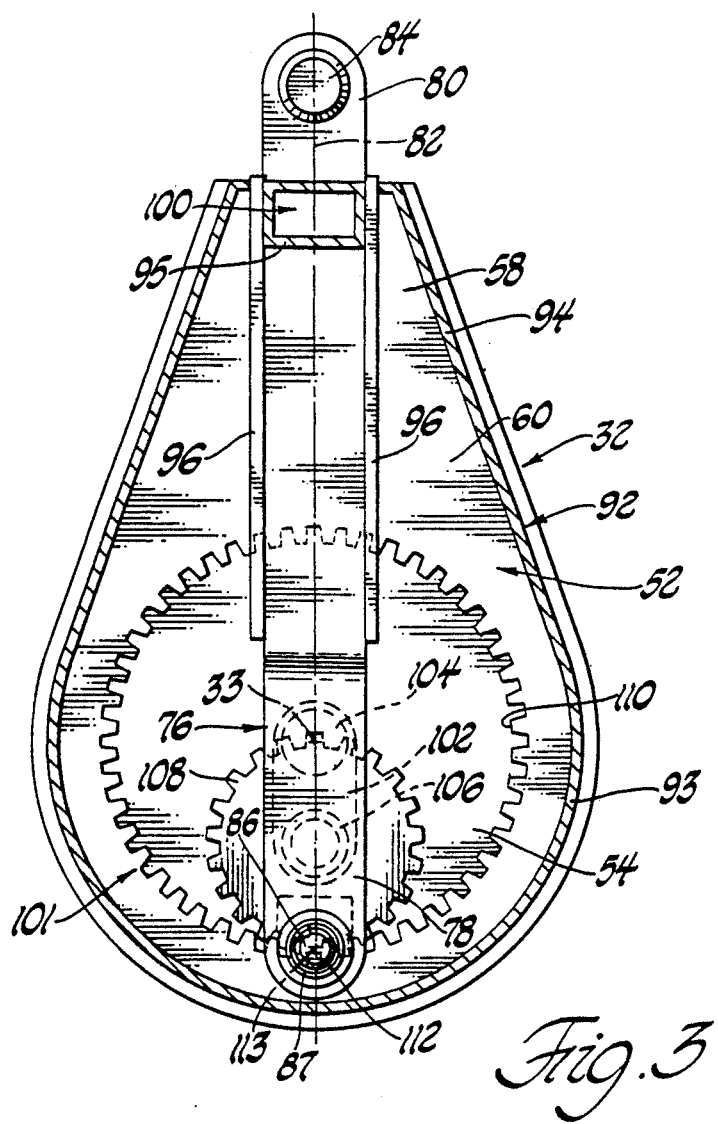
FIG. 3 is a view taken generally along the plane indicated by lines 3—3 in FIG. 2 and showing the wiper arm assembly in a minimum length condition at the mid-arc position.
Figure 4:
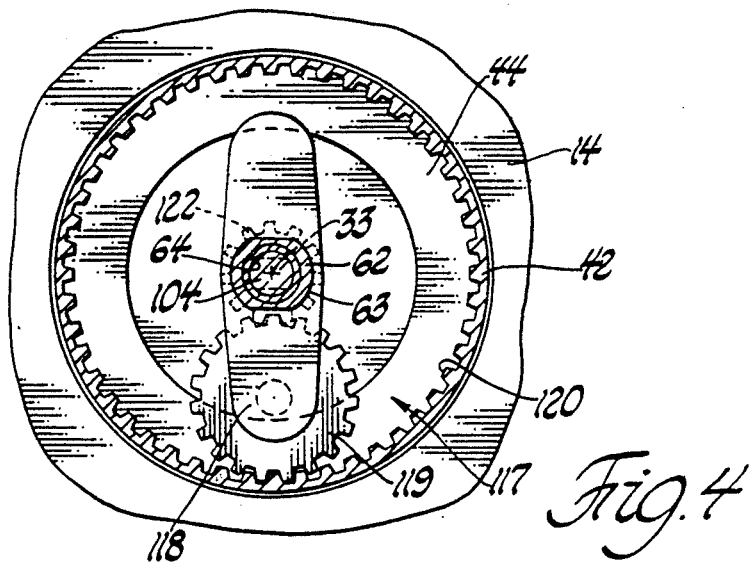
FIG. 4 is a view taken generally along the plane indicated by lines 4—4 in FIG. 2.
Figure 5:
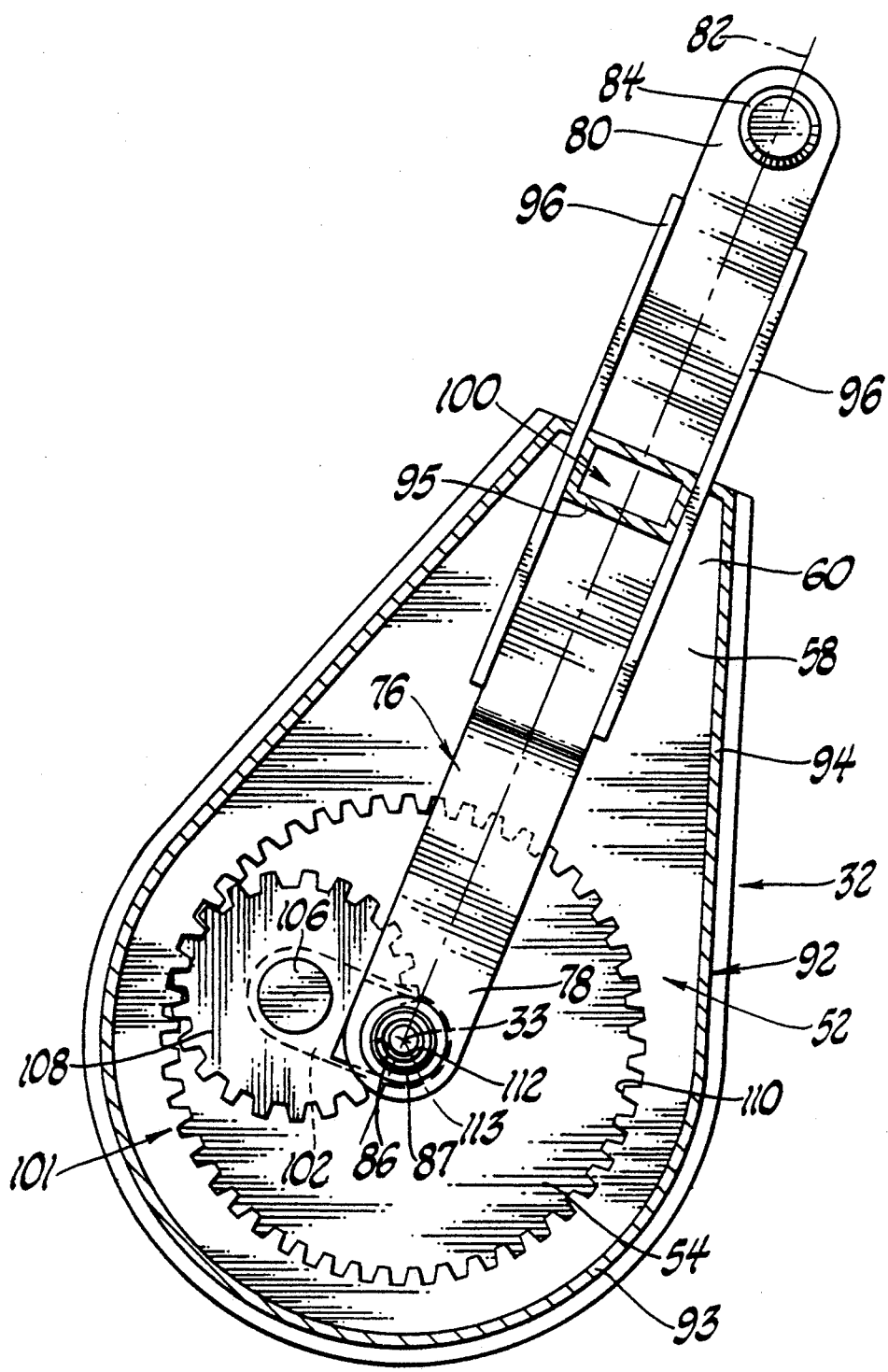
FIG. 5 is a view similar to FIG. 3 but showing the variable length wiper arm assembly in an intermediate condition between a maximum length condition and the minimum length condition.

With continued reference to FIGS. 2 and 3, the wiper arm assembly 32 further includes a base 52 having a flat, generally circular body 54 with a right cylindrical flange 56 therearound. A neck 58 of the base integral with the body 54 has an upper surface 60. A cylindrical stem 62 of the base integral with the body 54 has an outer cylindrical surface 63 and an internal bore 64. The outer surface 63 is rotatably supported or journaled in the right cylindrical flange 48 of the support plate 40 with the bore 64 centered on the pivot axis 33 so that the base 52 is rotatable relative to the mounting bracket and the vehicle body about the pivot axis 33.

With continued reference to FIGS. 2 and 3, the wiper arm assembly 32 further includes a wiper blade support arm 76 having an inboard end 78, an outboard end 80 and a longitudinal axis 82 extending therebetween. The blade support arm 76 has a knurled or serrated post 84 rigidly supported at the outboard end 80 thereof on the longitudinal axis 82 and an aperture 86 at the inboard end 78 thereof on the longitudinal axis 82 in which is disposed a bushing 87. A conventional wiper blade assembly 88 is rigidly attached to the support arm 76 through a hub 89 of the assembly pressed onto the knurled post 84. A spring biased arm 90 of the wiper blade assembly is pivotally connected to the hub 89 and carries at its outboard end a wiper blade 91. The arm 90 is spring biased toward the windshield 20 so that the wiper blade 91 is pressed against the latter for maximum wiping efficiency.

A cover 92 is disposed over the blade support arm 76 and is fastened to the base 52 by conventional means, not shown. The cover has a circular portion 93 which overlies the body 54 of the base and a triangular portion 94 which overlies the neck 58 of the base. Toward the apex of the triangular portion 94, the cover has a rectangular depression 95 therein which projects down between a pair of integral, parallel flanges 96 of the blade support arm 76. The rectangular depression 95 thus cooperates with the upper surface 60 of the base and the flanges 96 in defining an outboard guide 100 between the blade support arm 76 and the unit consisting of the base 52 and the cover 92. Because of its relatively short dimension in the direction of the axis 82 of the blade support arm, the outboard guide 100 does not, by itself, define a path of motion for the support arm relative to the base. Rather, the guide 100 cooperates with a hypocycloidal gear system 101 on the base which simultaneously guides the inboard end 78 of the support arm while reciprocating the latter relative to the base.

The hypocycloidal gear system 101 includes a rotary input member in the form of a drive arm 102 rigidly attached to one end of a transmission shaft 104 supported in the bore 64 of the stem 62 of the base 52. The transmission shaft 104 and the drive arm 102 are rotatable as a unit about the axis 33. A pin 106 carried by the drive arm 102 rotatably supports a planet gear 108 which meshes with a ring gear 110 formed on the inner surface of the right cylindrical flange 56 concentric with axis 33. A linear output member of the gear system 101 is defined by a cylindrical lug 112 integral with the planet gear 108. The lug 112 has a center line 113 and projects through the bushing 87 at the inboard end 78 of the support arm 76 thereby defining a pivotal connection between the planet gear and the support arm. In accord with the definition of hypocycloidal gearing, the planet gear 108 contains one half the number of teeth of the ring gear 110 and the center line 113 of the cylindrical lug 112 intersects the pitch line of the planet gear 108. Accordingly, rotary input at the drive arm 102 is accompanied by linear reciprocation of the lug 112 along a line intersecting the pivot axis 33 and through a stroke equal to the pitch diameter of ring gear 110. The angular orientation of the linear path of the lug 112 is a function of the position of the lug when the planet gear 108 is assembled onto the ring gear 110 and is selected such that the linear path coincides with the longitudinal axis 82 of the support arm. Accordingly, the lug 112 cooperates with outboard guide 100 in constraining the support arm 76 for linear reciprocation relative to the base 52 along the longitudinal axis of the support arm.

Referring to FIGS. 2 and 3, the hypocycloidal gear system 101 is driven by the transmission shaft 104 and a planetary gear set 117 in the chamber 44 of the mounting bracket 38. The planetary gear set 117 includes a carrier 118 rigidly attached to the stem 62 of the base 52 so that the carrier is rotatable as a unit with the base about the pivot axis 33. A planet gear 119 is rotatably supported on the carrier 118 and meshes with a ring gear 120 formed on the closure plate 42 concentric with the pivot axis 33 and with a sun gear 122 rigidly attached to the end of transmission shaft 104 opposite the drive arm 102 of the hypocycloidal gear system. When the base 52 is angularly oscillated about the pivot axis 33 the carrier 118 causes the planet gear 119 to overdrive the sun gear 122 so that multiple revolutions of the transmission shaft 104 are possible for less than a full revolution of the base 52 about the pivot axis 33. In particular, selection of the ratios of the sun gear 122, the planet gear 119 and the ring gear 120 is coordinated with the angular stroke of the base 52 about the pivot axis 33 such that for each complete angular stroke of the base the sun gear 122 revolves through 720°, i.e., makes two revolutions about axis 33.

The drive crank 26 functions to angularly oscillate the base 52, and hence the wiper arm assembly 32, about the axis 33 through the transfer link 28. The magnitude of the angular stroke of the base 52 about the axis 33 is a function of the diameter of the orbit of pin connection 30 between the drive crank 26 and the transfer link 28 which diameter may be limited by external constraints such as available space. Accordingly, while a simple pin type pivot connection between the inboard end of the transfer link 28 and the base 52 may be possible, it is more likely that a motion amplifying linkage arrangement, such as a 3 pivot 6 bar linkage, will be required. Such a linkage is partially illustrated for reference purposes in FIGS. 1 and 2 and includes the drive crank 26, the transfer link 28, an idler link 124 rotatably supported on a pivot pin 126 on the mounting bracket 38, and a connecting link 128 having one end connected to the base 52 through a pivot pin 130 on the body 54 and the other end, not shown, connected to the idler link 124 between the ends thereof. When an inboard end 132 of the transfer link 28, FIG. 2, is connected to the idler link 124, as for example by a pin 134, FIG. 2, substantially linear transverse reciprocation of the transfer link 28 produces rotation of the base 52 about the pivot axis 33 through angular strokes selected for maximum coverage of the windshield 20. The particular motion amplifying linkage arrangement employed, however, forms no part of this invention since the sole function of the linkage arrangement is to pivot the base 52 about the axis 33 through an arbitrary angular stroke and many potential mechanisms for effecting the same are available.

Describing, now, the operation of the wiper arm assembly 32 commencing with the base 52 in a parked position represented by a parked position 82' of the longitudinal axis 82 of the support arm 76, FIG. 1, initial actuation of the motor 22 causes the drive crank 26 to stroke from the long throw condition to the short throw condition without rotation about axis 27 to unpark the arm 90 and the blade 91. This, in turn, causes the base to rotate about pivot axis 33 from the parked position 82' to an inner wipe limit represented by an inner wipe limit position 82" of the longitudinal axis 82. At that instant, the transmission 24 initiates continuous rotation of the drive crank 26 in the short throw condition thereof about axis 27 whereby the base 52 is angularly oscillated about pivot axis 33 in a wiping arc defined between inner wipe limit 82" and an outer wipe limit represented by an outer wipe limit position 82''' of the longitudinal axis 82.

Movement of the support arm 76 relative to the base 52 is coordinated with angular oscillation of the base about pivot axis 33 as follows. The hypocycloidal gear system 101 is assembled on the base 52 such that in the parked position 82' of the base the lug 112 on the planet gear 108 is in the position shown in FIG. 3 corresponding to the minimum length condition of the wiper arm assembly. As the drive crank 26 strokes from the long throw to the short throw condition and the base rotates clockwise to inner wipe limit position 82", the planetary gear set 117 rotates the transmission shaft 104 and the drive arm 102 in the same direction but through a greater included angle corresponding to the gear ratios of the planetary set. The planet gear 108 is likewise rotated clockwise as the drive arm 102 rotates so that at the inner wipe limit position 82" of the base, the support arm 76 and the wiper blade 91 are slightly extended relative to the minimum length condition of the wiper arm assembly. Illustrative of the lengthening movement of the support arm 76 and wiper blade 91 is a segment a-b of a line 136, FIG. 1, traced by an inner end 138 of the wiper blade during angular movement of the base about pivot axis 33.

Figure 6:
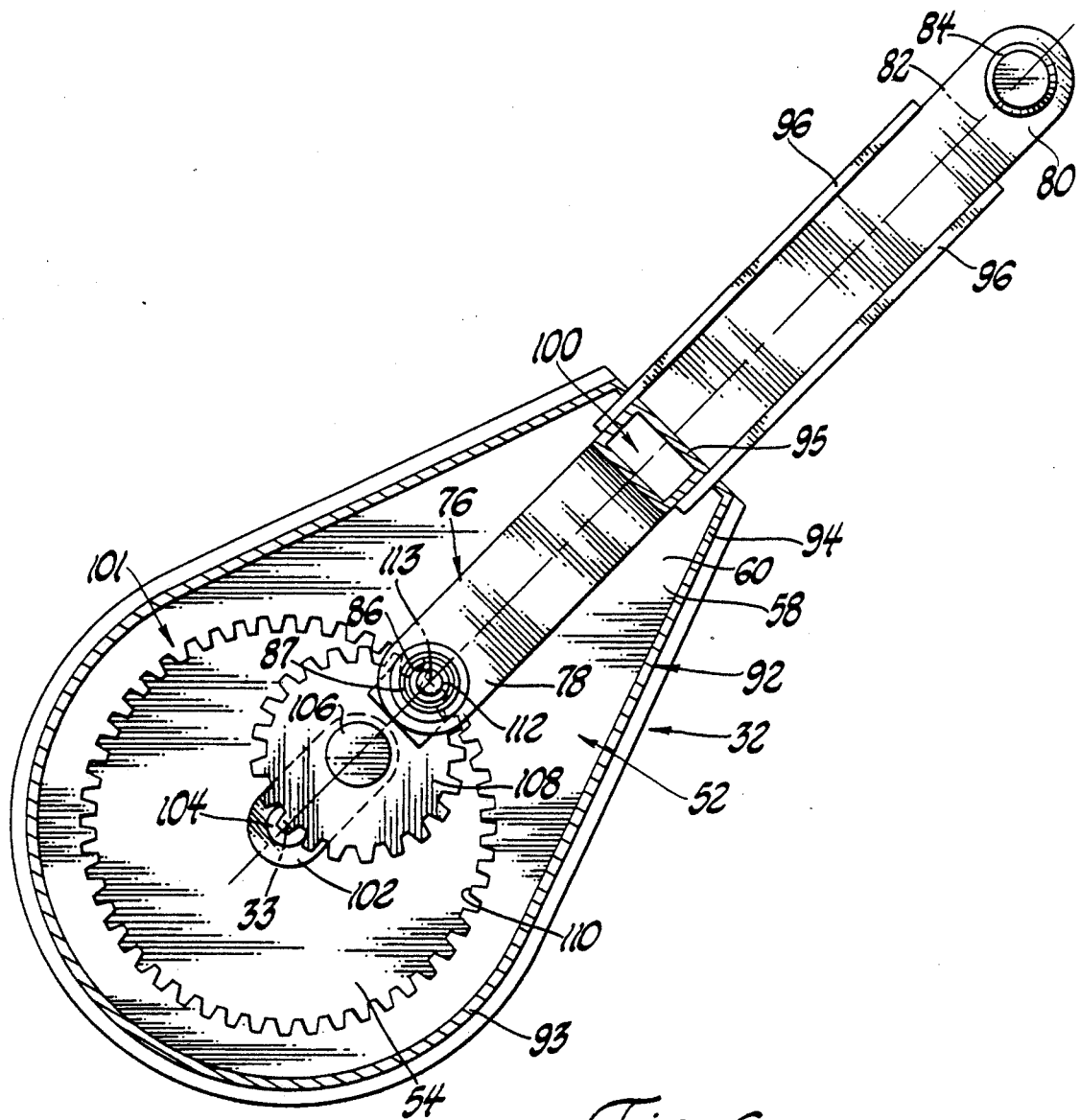
FIG. 6 is a view similar to FIG. 3 but showing the variable length wiper arm assembly in the maximum length condition at an angular position about midway between the mid-arc position and an inner wipe limit.

In the first 180° of rotation of the drive crank 26 about the axis 27, the base 52 is rotated about pivot axis 33 in a wipe stroke from inner wipe limit position 82" to outer wipe limit position 82''' with the outboard bearing reacting wiper blade torque between the support arm and the base. Concurrently, the planetary gear set 117 rotates the transmission shaft 104 and the drive arm 102 through an included angle which, when added to the included angle through which the drive arm 102 rotates during movement of the base from parked position 82' to inner wipe limit position 82", equals 720°. Accordingly, the support arm reciprocates linearly relative to the base and the length condition of the wiper arm assembly 32 changes from near minimum at inner wipe limit position 82", to maximum at about 25% of the wiping arc, to minimum at about 50% of the wiping arc, FIG. 3, to maximum at about 75% of the wiping arc, FIG. 6, and then to minimum again at the outer wipe limit position 82'''. Illustrative of the above described movement are, respectively, segments b-c, c-d, d-e, and e-f of line 136 traced by the inner end 138 of the wiper blade.

In the next succeeding 180° of rotation of the drive crank 26, the cycle of movement just described is repeated in reverse as the base 52 rotates counterclockwise in a wipe stroke from the outer wipe limit position 82''' to the inner wipe limit position 82". The wiper arm assembly 32 thereafter cycles as described for each wipe stroke as the drive crank 26 rotates continuously about axis 27 in the short throw condition. Obviously, because of the need to stow the wiper arm assembly 32 in the parked position 82', the pattern traversed by the wiper blade 91 is not quite symmetrical with respect to a longitudinal plane through the pivot axis 33. The difference in length of the wiper arm assembly between the minimum length condition at the outer wipe limit position 82''' and the slightly longer condition obtained at the inner wipe limit position 82" is not significant and may be unnoticeable or barely noticeable to an observer.

When termination of wiping is desired, the motor control, not shown, is set to halt rotation of the drive crank 26 about axis 27 at the inner wipe limit position 82" of the base. At that instant, the transmission 24 strokes the drive crank to the long throw condition thereby rotating the base 52 to the parked position 82'. As the base 52 thus rotates, the planet gear 108 of the hypocycloidal gear system rotates so as to cause lug 112 to return to its initial position corresponding to the minimum length condition of the wiper arm assembly.

The embodiments of the invention in which an exclusive property or privilege is claimed are defined as follows:

1. A variable length windshield wiper arm assembly comprising, a base, means supporting said base on a stationary panel for angular oscillation through a wiping arc about a pivot axis of said panel, a blade support arm having an inboard end and an outboard end and a longitudinal axis therebetween, outboard guide means defining a slide bearing between said base and said support arm at a location on the latter between said inboard and said outboard ends thereof, a hypocycloidal gear system having a rotary input member and a linear output member reciprocatable along a linear output path at a rate of two linear strokes between end limits for each revolution of said input member, means mounting said hypocycloidal gear system on said base with said linear output path coinciding with said support arm longitudinal axis, means connecting said linear output member to said support arm inboard end so that said linear output member cooperates with said outboard guide means in defining a linear path of motion for said support arm relative to said base coinciding with said support arm longitudinal axis while reciprocating said support arm relative to said base in linear strokes equal to the linear stroke of said output member, drive means on said stationary panel connected to said base including a transmission shaft, said drive means rotating said transmission shaft at a rate of about 720° for each angular stroke of said base through said wiping arc, and means connecting said transmission shaft to said rotary input member so that said output member and said support arm reciprocate at a rate of about four linear strokes for each angular stroke of said base through said wiping arc.

2. The variable length windshield wiper arm assembly recited in claim 1 wherein said outboard guide means includes a slide bearing on said base radially spaced from said pivot axis slidably engaging said support arm between said inboard and said outboard ends thereof whereby said slide bearing reacts blade torque between said support arm and said base while cooperating with said linear output member in defining said linear path of motion for said support arm relative to said base.

3. The variable length windshield wiper assembly recited in claim 2 wherein said means mounting said hypocycloidal gear system on said base includes means mounting a ring gear of said system on said base concentric with said pivot axis, means rigidly attaching a drive arm of said system to said transmission shaft for rotation about said pivot axis, and means mounting a planet gear of said system on a distal end of said drive arm for meshing engagement with said ring gear and said linear output member is a lug on said planet gear having a center line intersecting the pitch circle of said planet gear.

4. The variable length windshield wiper arm assembly recited in claim 3 wherein said drive means includes a bracket on said stationary panel, and a planetary gear set on the bracket consisting of a ring gear on the bracket concentric with said pivot axis and a sun gear on said transmission shaft and a planet gear meshing with said sun gear and with said ring gear and rotatably supported on a carrier rigidly connected to said base for angular oscillation therewith about said pivot axis, the gear ratios of said planetary gear set being selected to rotate said transmission shaft at a rate of about 720° for each angular stroke of said base through said wiping arc.

5. For motor vehicles, a windshield wiper having at least a single telescope arm, the arm being variable in its effective length during wiper movement,
- a drive housing comprising means for guiding the wiper arm during changing of wiper arm effective length,
- a first gear rim means provided with internal toothing, the first gear rim means being fixed to the drive housing,
- a first pinion means meshing with the first gear rim means for retracting and extending a displaceable part of the wiper arm, wherein the first pinion means has half the pitch diameter of the first gear rim means and being rotatable on a first axis of a crank means,
- a shaft of the crank means being rotatably guided on a second axis through an outer wall of the drive housing,
- a second pinion means fixed to said shaft outside the outer wall,
- a second gear rim means fixed to the vehicle, said second gear rim means meshing with said second pinion means, and
- means for articulating the extendible part of the wiper arm to the first pinion means on the pitch diameter of the first gear rim means.

6. A variable length windshield wiper arm assembly comprising, a base, means supporting said base on a stationary panel for angular oscillation through a wiping arc about a pivot axis of said panel, a blade support arm having an inboard end and an outboard end and a longitudinal axis therebetween, outboard guide means defining a slide bearing between said base and said support arm at a location on the latter between said inboard and said outboard ends thereof, a gear system having a rotary input member and a linear output member reciprocable along a linear output path at a rate of two linear strokes between end limits for each revolution of said input member, means mounting said gear system on said base with said linear output path coinciding with said support arm longitudinal axis, means connecting said linear output member to said support arm inboard end so that said linear output member cooperates with said outboard guide means in defining a linear path of motion for said support arm relative to said base coinciding with said support arm longitudinal axis while reciprocating said support arm relative to said base in linear strokes equal to the linear stroke of said output member, drive means on said stationary panel connected to said base including a transmission shaft, said drive means rotating said transmission shaft at a rate of about 720° for each angular stroke of said base through said wiping arc, and means connecting said transmission shaft to said rotary input member so that said output member and said support arm reciprocate at a rate of about four linear strokes for each angular stroke of said base through said wiping arc.

7. For motor vehicles, a windshield wiper having at least a single telescope arm, the arm being variable in its effective length during wiper movement,
- a drive housing comprising means for guiding the wiper arm during changing of wiper arm effective length,
- a first gear rim means provided with internal toothing, the first gear rim means being fixed to the drive housing,
- a first pinion means meshing with the first gear rim means for retracting and extending a displaceable part of the wiper arm, wherein the first pinion means has half the pitch diameter of the first gear rim means and being rotatable on a first axis of a crank means,
- a shaft of the crank means being rotatably guided on a second axis through an outer wall of the drive housing,
- a second pinion means fixed to said shaft outside the outer wall,
- a second gear rim means fixed to the vehicle, said second gear rim means being drivingly connected with said second pinion means, and
- means for articulating the extendible part of the wiper arm to the first pinion means on the pitch diameter of the first gear rim means.

* * * * *